United States Patent [19]

Fujimoto

[11] Patent Number: 5,508,856
[45] Date of Patent: Apr. 16, 1996

[54] IMAGE SIGNAL RECORDING AND REPRODUCING SYSTEM WITH A DETECTOR CIRCUIT TO DETERMINE THE SELECTION OF HEADS FOR REPRODUCTION

[75] Inventor: Ryo Fujimoto, Kanagawa, Japan

[73] Assignee: Canon Kabushiki Kaisha, Tokyo, Japan

[21] Appl. No.: 219,403

[22] Filed: Mar. 29, 1994

Related U.S. Application Data

[63] Continuation of Ser. No. 460,306, Jan. 3, 1990, abandoned.

[30] Foreign Application Priority Data

Jan. 12, 1989 [JP] Japan .......................... 1-3735

[51] Int. Cl.$^6$ .......................... G11B 15/12; H04N 5/78
[52] U.S. Cl. .................................. 360/63; 360/35.1
[58] Field of Search .......................... 360/33.1, 27, 64, 360/61, 63, 38.1, 35.1, 46, 31, 53; 369/55; 324/210, 212

[56] References Cited

U.S. PATENT DOCUMENTS

| | | | |
|---|---|---|---|
| 3,862,355 | 1/1975 | Guisinger | 360/14.2 |
| 3,922,669 | 11/1975 | Baldwin | 360/32 |
| 4,323,934 | 4/1982 | Giraud | 360/61 |
| 4,760,474 | 7/1988 | Takimoto | 360/64 |
| 4,796,128 | 1/1989 | Takimoto | 360/64 |
| 4,811,123 | 3/1989 | Yoshinaka | 360/64 |

FOREIGN PATENT DOCUMENTS 60-231942 11/1985 Japan .

*Primary Examiner*—W. Chris Kim
*Attorney, Agent, or Firm*—Robin, Blecker, Daley & Driscoll

[57] ABSTRACT

An image signal recording and reproducing system of this invention includes an apparatus for reproducing an image signal from a recording medium on which the image signal is recorded in a recording format selected between a first recording format for forming tracks on the recording medium by recording the image signal for one picture on the recording medium and a second recording format for forming, on the recording medium, tracks greater in number than the tracks formed in the first recording format. This system has n heads each for reproducing an image signal by tracing a track on the recording medium (n: an integer greater than one), and is arranged to detect a state of reproduction performed by each of the n heads prior to a reproduction processing operation when image signals are reproduced from a plurality of tracks formed on the recording medium in the second recording format, select m heads from among the n heads in accordance with a result of detection made by the detection circuit (m: a positive integer less than n), and perform a reproduction processing operation by using the selected m heads. With this arrangement, it is possible to reproduce image signals recorded on a magnetic medium through a head having optimal characteristics from among a plurality of heads, whereby the deterioration of image quality due to nonuniformity in the characteristics of each head is prevented and the image signals can be reproduced with high quality.

8 Claims, 13 Drawing Sheets

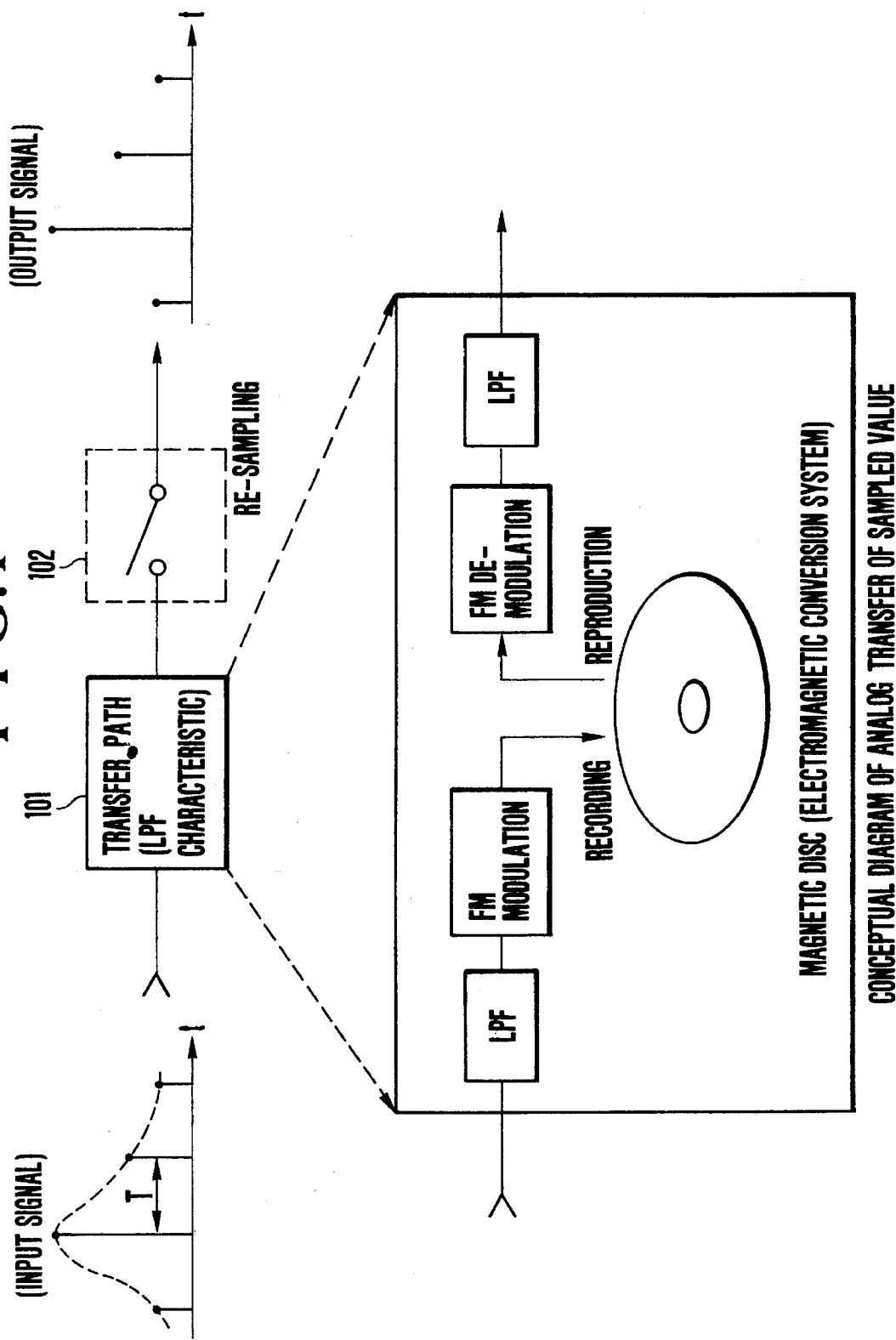

FIG.2(a)
INPUT SIGNAL
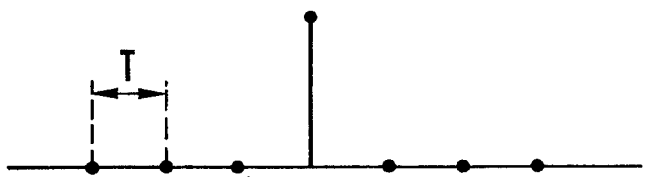
FIG.2(b)
TRANSFER-PATH
OUTPUT SIGNAL
FIG.2(c)
RE-SAMPLING PULSES
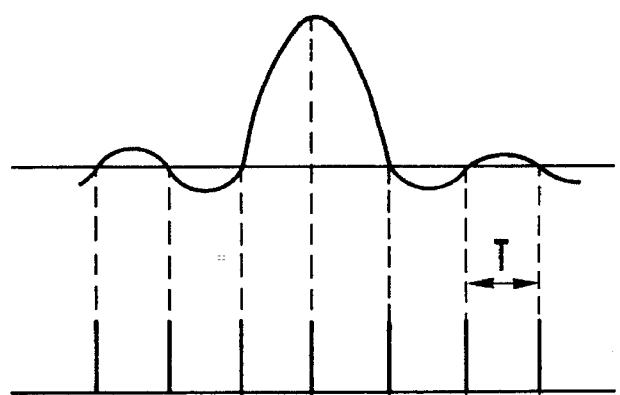
FIG.2(d)
OUTPUT SIGNAL
(RE-SAMPLED OUTPUT)
FIG.2(e)
RE-SAMPLING PULSES
OUT OF PHASE
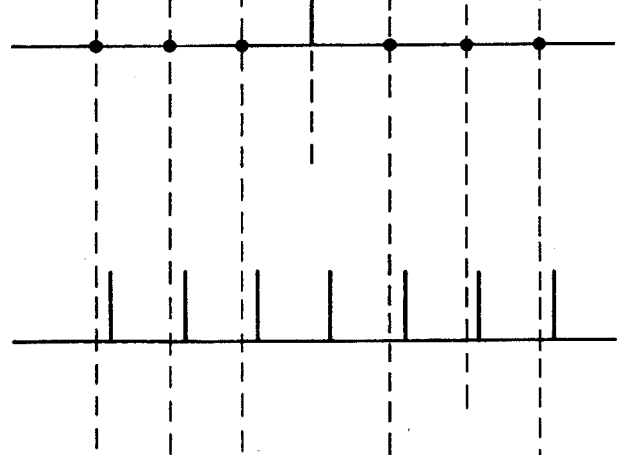
FIG.2(f)
RE-SAMPLED OUTPUT
CORRESPONDING TO FIG.2(e)
PRINCIPLE OF ANALOG TRANSFER OF SAMPLED VALUE

TRANSFER-PATH LPF CHARACTERISTIC OF ANALOG
TRANSFER OF SAMPLED VALUE

FREQUENCY ALLOCATION OF RECORDED SIGNAL BASED ON
SV FORMAT

Y-SIGNAL RECORDING SAMPLED PATTERN

RECORDING TRACK PATTERN

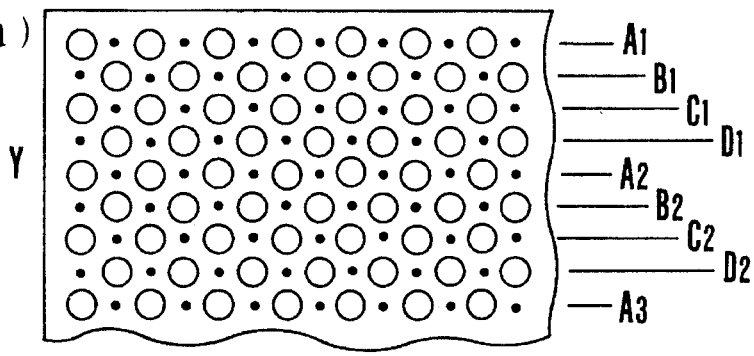
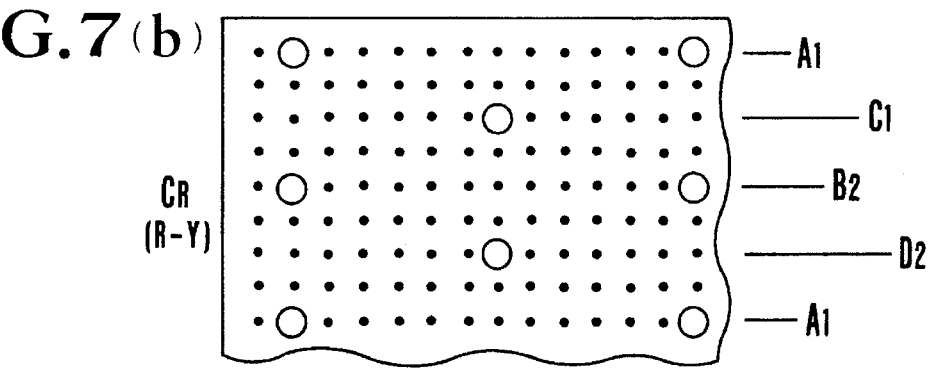
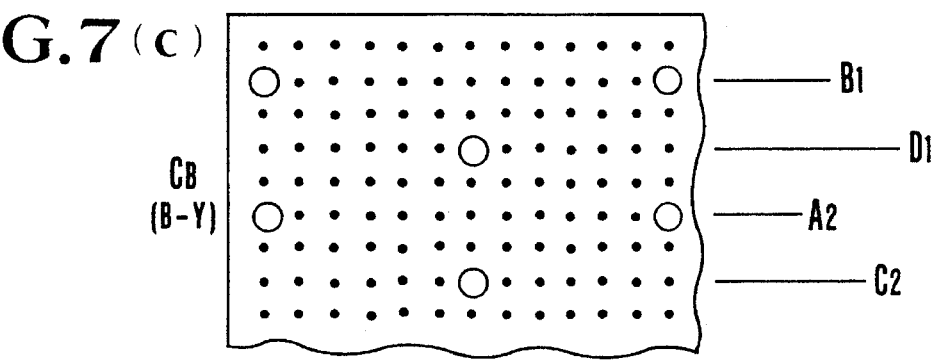
RECORDING SAMPLED PATTERN FOR Y SIGNAL AND C SIGNAL

FIG.8

|  | FIRST STEP (FIRST CYCLE OF SIMULTANEOUS 2-CH RECORDING) | SECOND STEP (SECOND CYCLE OF SIMULTANEOUS 2-CH RECORDING) |
|---|---|---|
| RECORDING TRACK | TRACKS 1 AND 2 | TRACKS 4 AND 3 |
| RECORDING SIGNAL | (TRACK 1)<br>$\begin{bmatrix} Y(A_i) \\ C_R(A_i)/C_B(B_i) \end{bmatrix}$<br>(TRACK 2)<br>$\begin{bmatrix} Y(B_i) \\ C_B(B_i)/C_R(A_i) \end{bmatrix}$ | (TRACK 3)<br>$\begin{bmatrix} Y(D_i) \\ C_B(D_i)/C_R(C_i) \end{bmatrix}$<br>(TRACK 4)<br>$\begin{bmatrix} Y(D_i) \\ C_R(C_i)/C_B(D_i) \end{bmatrix}$ |
| IMAGING SECTION OUTPUT $(Y_1, Y_2, R, B)$ | $Y_1=Y(A_i)$<br>$Y_2=Y(B_i)$<br>$R=R(A_i)$<br>$B=B(B_i)$ | $Y_1=Y(D_i)$<br>$Y_2=Y(C_i)$<br>$R=R(C_i)$<br>$B=B(D_i)$ |

WHERE
$\begin{cases} Y(*): \text{Y SIGNAL ON LINE } * \\ C_R(*): C_R \text{ SIGNAL ON LINE } * \\ C_B(*): C_B \text{ SIGNAL ON LINE } * \\ R(*): \text{R SIGNAL ON LINE } * \\ B(*): \text{B SIGNAL ON LINE } * \end{cases}$

FIG.13

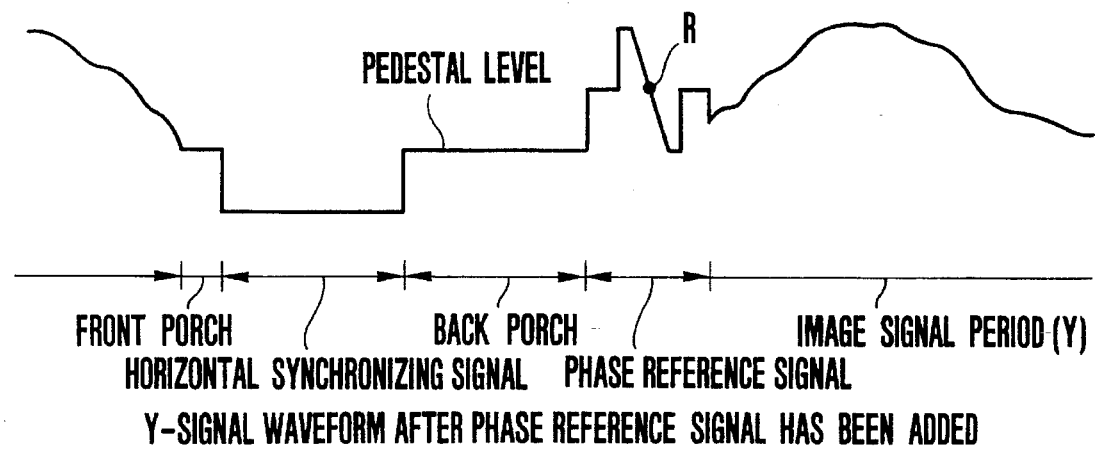

FRONT PORCH   BACK PORCH   IMAGE SIGNAL PERIOD (Y)
HORIZONTAL SYNCHRONIZING SIGNAL   PHASE REFERENCE SIGNAL
Y-SIGNAL WAVEFORM AFTER PHASE REFERENCE SIGNAL HAS BEEN ADDED

EXAMPLE OF THE ARRANGEMENT OF COLOR FILTERS

IMAGING SECTION

FIG. 15 RELATIONSHIP BETWEEN PHASE REFERENCE SIGNALS FOR Y AND C SIGNALS

IMAGE SIGNAL RECORDING AND REPRODUCING SYSTEM WITH A DETECTOR CIRCUIT TO DETERMINE THE SELECTION OF HEADS FOR REPRODUCTION

This is a continuation application under 37 CFR 1.62 of prior application Ser. No. 09/460,306, filed Jan. 3, 1990 abandoned.

BACKGROUND OF THE INVENTION

1. Field of the Invention

The present invention relates to an image signal recording and reproducing system for recording an image signal on a recording medium and for reproducing the image signal recorded on the recording medium.

2. Description of the Related Art

Still video (SV) systems are known as one type of apparatus for recording and reproducing still image signals. The SV systems are arranged to record TV signals based on the current television signal format on 2-inch magnetic discs by utilizing frequency modulation. However, the resolution attained with such a system is limited by that of the current TV system. For this reason, it is pointed out that, if a printer is used to produce a printout as the final output from a still image recorded by such an SV system, the obtained image quality (particularly, the resolution) will be low compared to that of a typical silver-halide photograph.

It is also known that several novel television systems such as a high-definition television (HDTV) system have recently been proposed. The HDTV system is characterized by about one thousand scanning lines which have about twice the number of scanning lines used in the current HTSC system, and is also provided with a corresponding horizontal signal band. Accordingly, it has been strongly desired to develop a still image recording and reproducing system capable of recording and reproducing a still image signal which compares with the image quality of 1,000×1,000 pixels (per square image area on a TV screen) realized by the HDTV system or the like.

In light of such a situation, the SV systems adopt high-band (wide-band) recording formats to effect recording and reproduction on and from recording media.

However, it is desired that an improvement in the image quality of the SV systems be achieved while compatibility with the conventional format is being maintained.

One method of improving the image quality while maintaining compatibility with the conventional format is the CHSV (compatible high definition SV) system which was proposed by the applicant of the present invention.

The following is an explanation of the CHSV system proposed by the present applicant.

The CHSV system utilizes an art called analog transfer of sampled values.

A system for analog transfer of sampled values is, as shown in FIG. 1, characterized by transfer-path characteristics (LPF characteristics) and re-sampling. More specifically, the system is arranged to pass the input sampled value through a frequency-modulation section, an electromagnetic conversion section and a frequency-demodulation section and then to restore the sampled value by re-sampling.

The principle of the analog transfer of sampled values is explained in more detail with reference to FIGS. 2(a) to 2(f). In the following explanation, it is assumed that a sequence of sampled values of period T, shown in FIG. 2(a), is recorded and reproduced. The transfer path shown in FIG. 1, which includes the frequency modulation section, the electromagnetic conversion section and the frequency demodulation section, has a low-band transmission characteristic, i.e., a low-pass filter (LPF) characteristic. FIG. 2(b) shows the output of this transfer path. The illustrated transfer-path output is re-sampled with a sequence of re-sampling pulses of period T and in correct phase, such as that shown in FIG. 2(c), to provide the signal shown in FIG. 2(d). As can be seen from FIG. 2(d), the sequence of input sampled values is correctly reproduced (transferred). However, if the re-sampling pulses are out of phase as shown in FIG. 2(e), the sequence of sampled values is not correctly reproduced (transferred), resulting in ringing such as that shown in FIG. 2(f). Accordingly, to accomplish the above analog transfer of sampled values, during reproduction (on the receiving side) it is necessary to generate a sequence of re-sampling pulses of correct frequency (period), corresponding to the reproduced (received) sampled-value signals, and it is also necessary that a sequence of re-sampling pulses of correct phase corresponding to the reproduced (received) sampled-value signals be generated. The other requirement for completely transferring sampled-value signals is as follows: the transfer path, including the frequency modulation and demodulation sections and the electromagnetic conversion section, has a linear phase and a frequency characteristic which exhibits symmetrical roll-off centered at a sampling frequency $f_s$ (= 1/2 T).

More specifically, it is necessary that the transfer path have an LPF characteristic such as that shown in FIG. 3. The outline of the analog transfer of sampled values has been explained.

The following is an explanation of a method of recording the chrominance (Y) signal on the basis of the CHSV system.

FIG. 4 is a diagram showing sample points for a Y signal to be recorded on a magnetic disc. As shown in FIG. 4, the sample points for the Y signal are arranged in offset form for the purpose of subsampling transfer. Also, 650 (1300/2) sample points are in a row and 500(1000/2) sample points are in a column. The sampled values contained in rows $A_1$, $A_2$, ... are recorded on a single track on the magnetic disc, the sampled values contained in rows $B_1$, $B_2$, ... on another track, and so on. In this manner, the signals indicating all the sample points are recorded on a total of four tracks.

The sample points are recorded on each track in a format according to a known SV format. FIG. 5 shows the frequency allocation of a signal recorded in the SV format. As shown in FIG. 5, in the SV format, the basebands of recorded Y and C signals are 7 MHz or less and 1 MHz or less, respectively.

In FIG. 4, each row includes 650 Y-signal sample points, and these points are recorded within the horizontal effective frame period (53 μsec or less) of a NTSC-TV signal. Accordingly, the corresponding sampling frequency $f_s$ (refer to FIG. 3) is 6.1 MHz or less. In the above-described manner, the Y signal having a band such as that shown in FIG. 3 is recorded.

FIGS. 6(a) and 6(b) show two different recording patterns formed on the magnetic disc on the basis of the CHSV system. FIG. 6(a) shows the recording pattern formed when a 2-channel (2-ch) head is utilized, while FIG. 6(b) shows the recording pattern formed when a 4-channel (4-ch) head is utilized. (Needless to say, the 4-ch head can be utilized to form either of the recording patterns shown in FIGS. 6(a) and 6(b).)

The recording pattern of FIG. 6(a) is formed as follows. First, the sampled values of the Y signal on the row $A_i$ and the row $B_i$ (i=a positive integer), i.e., the sampled values for two channels, are simultaneously recorded on the first and second tracks, respectively, by means of the 2-ch head. Then, the 2-ch head is moved to the third and fourth tracks (this movement is not needed when a 4-ch head is in use), and the sampled values of the Y signals on the row $D_i$ and the row $C_i$, i.e., the sampled values for two channels, are simultaneously recorded. During this time, as illustrated, in order to maintain compatibility with the conventional SV format, the positional relationship between the tracks for recording the sampled values of the Y signal on the rows $D_i$ and $C_i$ are reversed.

In general, simultaneous 2-ch recording involves the problem of crosstalk arising between signals in a head during recording. However, the use of the recording method described above makes it possible to solve such problem since well-known H alignment is effected between two heads during simultaneous recording.

Where a 4-ch head is utilized, recording may be performed in accordance with the recording pattern shown in FIG. 6(b). More specifically, the sampled values of the Y signal on the row $A_i$ and the row $B_i$, i.e., the sampled values for two channels, are simultaneously recorded on the first and third tracks, respectively. Then, the sampled values of the Y signals on the row $C_i$ and the row $D_i$, i.e., the sampled values for two channels, are simultaneously recorded on the second and fourth tracks, respectively.

With the above-described recording method, in the case of the recording pattern of FIG. 6(a), it is possible to reproduce a frame image based on the conventional SV format from the second and third tracks. As for the recording pattern of FIG. 6(b), it is possible to reproduce a frame image based on the conventional SV format from the first and second tracks or the third and fourth tracks.

The process of recording a Y signal in the CHSV system is as described above.

The following is an explanation of the process of recording the color-difference line-sequential (C) signal in the CHSV system.

FIGS. 7(a), 7(b) and 7(c) show the relationship between the recording sample patterns of a Y signal, a $C_R$ (R-Y) signal and a $C_B$ (B-Y) signal. In the conventional SV format, a recording band allocated for a color-difference signal is about ⅙ that of the Y signal, and the color-difference signal is recorded in a line-sequential manner. Accordingly, the sample patterns of the color-difference signals $C_R$ and $C_B$ in the CHSV system are as shown in FIGS. 7(b) and 7(c), respectively. In the right-hand side of each of FIGS. 7(b) and 7(c), lines of Y signals to be recorded on individual tracks are indicated by reference numerals $A_i$, $B_i$, $C_i$ and $D_i$, respectively. Although the lines of the Y signals do not completely coincide with the lines of the corresponding C signals, this pattern is intended for compatibility with the SV format.

FIG. 8 is a table which shows the relationship between the recording positions of the Y and C signals. In the table, "First Step" indicates "simultaneous 2-ch recording executed in a first step", and "Second Step" likewise indicates "simultaneous 2-ch recording executed in a second step". As described above, in the first step, recording for tracks 1 and 2 is executed and, in the second step, recording for tracks 3 and 4 is executed. Referring to FIG. 8, for example, in the first step $Y(A_j)$ and $C_R(A_i)/C_B(B_i)$ are recorded on the first track. $Y(A_i)$ indicates a Y signal consisting of a sequence of Y sampled values along the line $A_i$ shown in FIG. 7(a) and $C_R(A_i)/C_B(B_i)$ indicates a color-difference line-sequential signal which is formed by a $C_R$ signal consisting of a sequence of $C_R$ sampled values along the line $A_i$ shown in FIG. 7(b) and a $C_B$ signal consisting of a sequence of $C_B$ sampled values along the line $B_i$ shown in FIG. 7(c) $C_R(A_i)/C_B(B_i)$ starts with a $C_R$ signal. In FIG. 8, imaging-section outputs $Y_1$, $Y_2$, R, B are signals which are simultaneously output from the imaging section of a CHSV camera, which will be described later.

The following is an explanation of the construction of the CHSV camera (a device constituted by an imaging section and a recording section).

The CHSV camera shown in FIG. 9 is, as described above, arranged to record image signals for one picture by continuously performing simultaneous 2-ch recording twice. In the first step shown in FIG. 8, the following process is performed. Y and C signals are input to each of SV recording processing circuits 826 and 827. Each of these circuits 826 and 827 effects predetermined processes such as emphasis, frequency modulation and the like on the input Y and C signals, then frequency-multiplexes the Y and C signals thus processed, and then outputs the frequency-multiplexed signal. Adders 828 and 829 add sine-wave signals, as reference signals for TBC (time base correction) in reproduction, to the output signals from the corresponding SV recording processing circuits 826 and 827 (The frequency of the sine-wave signal is 2.5 MHz or near (2.5 MHz corresponds to the gap between FM-Y and FM-C as shown in FIG. 5)) and BPF 825. The signals output from the adders 828 and 829 are amplified by recording amplifiers 830 and 831, respectively. The resulting signals for two channels are simultaneously recorded on predetermined tracks of a magnetic disc 834 by 2-ch heads 832 and 833, respectively. In the second step, after the 2-ch heads 832 and 833 have been moved, recording is performed in a manner similar to that explained in the above first step.

The imaging section 801 shown in FIG. 9 is explained below.

FIG. 10 is a partial schematic view showing the construction of a color filter assembly for use with a single solid-state image sensor which constitutes the imaging section 801. As shown in FIG. 10, the color filter assembly consists of Y (chrominance) filters which are arranged in checkered form and the remaining R and B filters which are arranged in line-sequential form.

FIG. 11 is a view showing an example of the construction of the imaging section 801 which includes a solid-state imaging device provided with the color filter assembly shown in FIG. 10.

Referring to FIG. 11, the imaging section 801 includes a solid-state image sensor 1301 having the color filter assembly shown in FIG. 10 and sample-and-hold circuits 1302 to 1305. The solid-state image sensor 1301 has pixels of the order of 1300 pixels×1000 pixels and an arrangement capable of simultaneously reading out signals for two adjacent horizontal lines every other two lines.

In FIG. 11, of the simultaneously read signals for two lines, the Y signal ($Y_1$) of the upper line is output to a signal line 0-1, the Y signal ($Y_2$) of the lower line to a signal line 0-3, an R signal to a signal line 0-2, and a B signal to a signal line 0-4.

The sample-and-hold circuits 1302 to 1305 sample, hold and output the Y signal ($Y_1$), the Y signal ($Y_2$), the R signal and the B signal at predetermined timings, respectively.

FIG. 12 is a schematic view showing a specific example of a solid-state image sensor having the aforesaid arrangement capable of simultaneously reading out signals for two adjacent horizontal lines every other two lines, and the illustrated solid-state image sensor is made from a MOS type solid-state image sensor.

The MOS type solid-state image sensor of FIG. 12 is of a TSL (transversal signal line) type which is well known.

Since, even in the CHSV system, the MOS type solid-state image sensor shown in FIG. 12 allows signals to be read in horizontal order, it is possible to provide the effect of suppressing smear or the like.

Furthermore, since the signal-reading operation of the MOS type solid-state image sensor is based on an X-Y address method, it is possible to simultaneously read two lines of signals as described above. For the sake of simplicity, no detailed description is given of such a signal-reading operation.

The following is an explanation, referring to FIG. 9, of the signal processing in which the imaging section 801 is driven to output the $Y_1$, $Y_2$, R and B signals by an imaging-section driving circuit 808 in synchronism with a synchronizing signal output from a clock generator 813, and those signals are input to the SV recording processing circuits 826 and 827. The signal processing operations associated with Y and C signals are separately explained in that order.

To begin with, a signal processing operation for the Y signal is explained. The Y1 and Y2 signals output from the imaging section 801 (refer to FIG. 8 for the details of $Y_1$ and $Y_2$) are supplied to adders 814 and 816, respectively. The adders 814 and 816 add, to the respective $Y_1$ and $Y_2$ signals, phase reference signals output from a phase reference signal generator 818. Such phase reference signal provides a phase reference for re-sampling operation during reproduction, as will be explained later. One phase reference signal may be inserted every 1H period (horizontal synchronizing period) or every 1V period (vertical synchronizing period). FIG. 13 shows an example in which one phase reference signal is inserted during every 1H period. As shown in FIG. 13, the phase reference signal is a three-level signal, and R indicates a phase reference point.

The $Y_1$ and $Y_2$ signals, to which such phase reference signals have been added by the respective adders 814 and 816, are respectively passed through low-pass filters (LPFs) 802 and 805 each of which transmits a frequency band of 6 MHz. The signals output from the LPFs 802 and 805 are passed through gamma correction circuits ($\gamma_Y$) 821 and 823 and input to the SV recording processing circuits 826 and 827, respectively.

$\gamma_Y$'s 821 and 823 serve as $\gamma$ correction circuits for the corresponding transfer paths and are inserted for the purposes of improving the S/N ratio of a dark portion of a chrominance signal, maintaining compatibility with the conventional SV format, and so on.

Then, the signal processing operation for the C signal is explained. The R and B signals output from the imaging section 801 (refer to FIG. 8 for the details of R and B) are respectively passed through LPFs 804 and 807, each of which transmits a frequency band of 1 MHz, and are input to switch circuits $S_1$ and $S_2$. The switch circuits $S_1$ and $S_2$ operate to switch every 1H period, thereby providing color line-sequential signals R/B (output from $S_1$) and B/R (output from $S_2$).

A subtracter 809 subtracts the signal $Y_1$ output from LPF 803 having a transmission frequency band of 1 MHz from the output signal from the switch circuit $S_1$, while a subtracter 810 subtracts the signal $Y_2$ output from LPF 806 having a transmission frequency band of 1 MHz from the output signal from the switch circuit $S_2$. A color-difference line-sequential signal $C_R/C_B$ is output from the subtracter 809 and a color-difference line-sequential signal $C_B/C_R$ from the subtracter 810.

The color-difference line-sequential signal $C_R/C_B$ and the color-difference line-sequential signal $C_B/C_R$ are sampled by respective sample-and-hold circuits 811 and 812, thereby providing the sample patterns $C_R$ and $C_B$ shown in FIGS. 7(b) and 7(c). The sampled signals are supplied to adders 815 and 817, respectively. Sampling clocks are supplied from the clock generator 813.

In the respective adders 815 and 817, phase reference signals are added to the sampled signals as in the case of the Y signal. (However, a phase reference point for the C signal does not have to coincide with the phase reference position for the Y signal.)

The signals output from the adders 815 and 817 are input to the SV recording processing circuits 826 and 827 through LPFs 819 and 820 and gamma correction circuits ($\gamma_C$) 822 and 824, respectively.

The following is an explanation of the construction of a CHSV reproducing apparatus.

FIG. 14 is a block diagram showing the construction of the CHSV reproducing apparatus.

The signal reproduced from a magnetic disc 1501 by a magnetic head 1502 is input to both an SV reproduction processing circuit 1504 and a BPF 1505 through a preamplifier 1503.

The SV reproduction processing circuit 1504 performs frequency-separation of FM-Y and FM-C signals (refer to FIG. 5) from the input reproduced signal, then applies frequency demodulation, de-emphasis and the like to each of the signals, and then outputs a reproduced Y signal and a reproduced C signal.

Reverse gamma correction circuits ($\gamma_Y^{-1}$) 1506 and ($\gamma_C^{-1}$) 1507, which follow the SV reproduction processing circuit 1504, are provided for recovering the original signal from signals which were subjected to transfer-path $\gamma_Y$ and $\gamma_C$ correction during recording, respectively. The Y signal is corrected by the reverse gamma correction circuits ($\gamma_Y^{-1}$) 1506, passed through an LPF 1508, and input to an A/D converter 1513 and a sync separating circuit 1510, while the C signal is corrected by the reverse gamma correction circuits ($\gamma_C^{-1}$) 1507, passed through an LPF 1509, and input to a variable delay circuit 1528.

The following is an explanation of a process for generating re-sampling clocks during reproduction.

Referring to FIG. 14, the BPF 1505 separates a reference signal $f_r$ for reproduction TBC from a reproduced signal. The reference signal $f_r$ is input to a PLL (Phase-Locked Loop) circuit 1526. The PLL circuit 1526 generates and outputs a clock $f_{so}$ which is phase-synchronized with the signal $f_r$ and which has a frequency equal to the frequency of a re-sampling clock for a Y signal.

A phase control circuit 1511 for a Y-signal re-sampling clock executes phase control of the re-sampling clock $f_{so}$ thus obtained, thereby outputting a Y-signal re-sampling clock $f_{s1}$, the phase of which has, as shown in FIG. 15, a predetermined relationship to the phase reference point of the aforesaid Y-signal re-sampling phase reference signal added to the reproduced Y signal.

A clock ($f_{s1}/6$) is used as a re-sampling clock for a C signal. The clock ($f_{s1}/6$) is obtained by dividing the aforesaid clock $f_{s1}$ by six by a 1/6 frequency divider 1527. The 1/6 frequency divider 1527 consists of elements such as a counter, and the count of the counter is reset by the falling edge of a synchronizing signal. The C signal output from the LPF 1509 is delay-controlled by the variable delay circuit 1528 whose delay time is controlled by a C-signal delay control signal generating circuit 1529, whereby the phase relationship between the C-signal re-sampling clock ($f_{s1}/6$) and the re-sampling phase reference point added to the C signal is rendered constant. The C signal thus processed is supplied to an A/D converter 1514.

The respective A/D converters 1513 and 1514 of FIG. 14 perform A/D conversion of the Y signal and the C signal by utilizing the thus-generated re-sampling clocks as clocks. The Y signal and C signal thus A/D converted are written into an image memory 1515. Write addresses associated with the image memory 1515 are generated by an address generator 1517.

The CHSV reproducing apparatus shown in FIG. 14 repeats the aforesaid reproducing operation for all the four tracks (the first track to the fourth track) shown in FIGS. 6(*a*) and 6(*b*), thereby storing all the sampled values recorded in the four tracks on the magnetic disc 1501, in the image memory 1515 shown in FIG. 14.

Thereafter, an image processing circuit 1516 executes processes such as interpolation and rearrangement of the C-signal data by utilizing the sampled-value data stored in the image memory 1515. The image processing circuit 1516 executes an LPF process for extracting a two-dimentional spatial frequency through a two-dimensional digital filter, thereby providing a low-band component $Y_L$. The image processing circuit 1516 then performs arithmetic operations on ($Y-Y_L$) to provide the high-frequency component $Y_H$ of the sampled-value data of the Y signal. Accordingly, four kinds of data $Y_H$, $Y_L$, $C_R$ and $C_B$ are stored in the image memory 1515.

After the above process has been completed, the respective kinds of data are read from the image memory 1515 in predetermined order at a predetermined clock rate in accordance with the read addresses specified by the address generator 1517.

Of the $Y_H$, $Y_L$, $C_R$ and $C_B$ signals read from the image memory 1515, the $Y_L$, $C_R$ and $C_B$ signals are converted into the $R_L$, $G_L$, and $B_L$ signals by a matrix circuit 1519. The $R_L$, $G_L$ and $B_L$ signals are added to the $Y_H$ signal by adders 1520, 1521 and 1522, respectively. The adders 1520, 1521 and 1522 output a ($R_L+Y_H$) signal a ($G_L+Y_H$) signal and a ($B_L+Y_H$) signal.

The respective signals output from the adders 1520, 1521 and 1522 are converted into analog signals by corresponding D/A converters 1523, 1524 and 1525, so that the R, G and B signals are output.

As described above, the reproducing apparatus according to the CHSV system proposed by the present applicant is arranged to be capable of reproducing either of recorded signals based on the CHSV system and recorded signals based on the conventional SV format by means of a single in-line 2-ch magnetic head for reproducing signals recorded on tracks of a magnetic disc.

However, if the aforesaid reproducing apparatus is to reproduce recorded signals based on the CHSV system, the apparatus will reproduce four tracks on a magnetic disk by means of a 2-ch magnetic head while switching the four tracks by using the channel switch of the 2-ch magnetic head as in the case of frame reproduction in the reproducing apparatus according to the conventional SV format. However, it is difficult to make uniform the characteristics (e.g., the frequency characteristic) of each channel of the 2-ch magnetic head, and the channels more or less differ in characteristics. If the characteristics of the respective channels of the 2-ch magnetic head are not uniform, the levels and frequency characteristics of the reproduced signals will become nonuniform. As a result, the final image may contain flickers or the like.

SUMMARY OF THE INVENTION

It is therefore an object of the present invention to provide an image signal recording and reproducing system capable of solving the above-described problems.

It is another object of the present invention to provide an image signal recording and reproducing system provided with a plurality of heads and capable of reproducing image signals recorded on a recording medium through a head having optimal characteristics.

To achieve the above objects, in accordance with one aspect of the present invention, there is provided an image signal reproducing apparatus for reproducing an image signal from a recording medium on which the image signal is recorded in a recording format selected between a first recording format for forming tracks on the recording medium by recording the image signal for one picture on the recording medium and a second recording format for forming, on the recording medium, tracks greater in number than the tracks formed in the first recording format. The image signal reproducing apparatus is provided with n heads each for reproducing an image signal by tracing a track on the recording medium (n: an integer greater than one), detection means for detecting a state of reproduction performed by each of the n heads prior to a reproduction processing operation when image signals are reproduced from a plurality of tracks formed on the recording medium in the second recording format, and reproduction processing means for selecting m heads from among the n heads in accordance with a result of detection made by the detection means (m: a positive integer less than n) and for performing a reproduction processing operation by using the selected m heads.

It is another object of the present invention to provide an image signal recording and reproducing system capable of faithfully and stably reproducing image signals recorded on a recording medium.

To achieve the above objects, in accordance with another aspect of the present invention, there is provided an image signal reproducing apparatus for reproducing an image signal from a recording medium on which the image signal is recorded in a recording format for forming four tracks on the recording medium by recording an image signal for one picture on the recording medium. The image signal reproducing apparatus is provided with n heads each for reproducing an image signal by tracing a track on the recording medium (n: an integer greater than one), detection means for detecting a state of reproduction performed by each of the n heads prior to a reproduction processing operation when image signals are reproduced from four tracks formed on the recording medium in the second recording format, reproduction processing means arranged to select a single head from among the n heads in accordance with a result of detection made by the detection means, perform a reproduction processing operation for the four tracks on the recording medium by using the selected head, and output a reproduced signal thus obtained, and memory means for storing the reproduced signal output from the reproduction processing means.

The above and other objects, features and advantages of the present invention will become apparent from the following detailed description of embodiments of the present invention, taken in conjunction with the accompanying drawings.

BRIEF DESCRIPTION OF THE DRAWINGS

FIG. 1 is a schematic diagram which serves to illustrate a system for analog transfer of sampled values;

FIGS. 2(a) to 2(f) are waveform diagrams showing the principle of the analog transfer of sampled values;

FIGS. 7(a) and 7(c) are views showing sample points for Y and C signals to be recorded on a recording medium;

FIG. 8 is a table showing the positional relationships between the Y and C signals recorded on a recording medium;

FIG. 13 is a diagram showing the waveform of a luminance signal to which a phase reference signal is added;

DETAILED DESCRIPTION OF THE PREFERRED EMBODIMENT

The preferred embodiment of the present invention will be described below with reference to the accompanying drawings.

Figure 16:
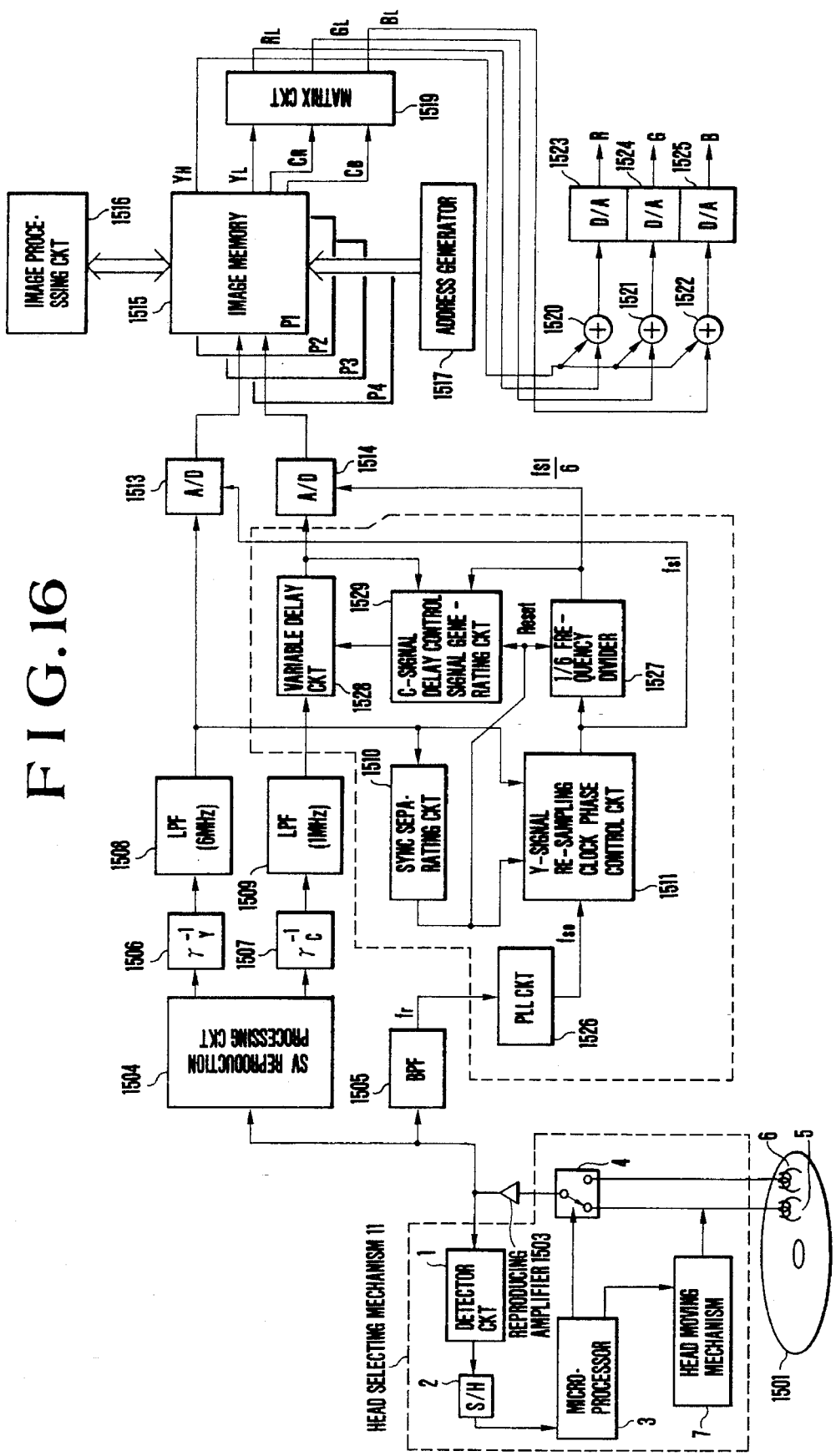
FIG. 16 is a block diagram showing in outline the construction of an image signal reproducing apparatus according to an embodiment of the present invention.

FIG. 16 is a block diagram which diagrammatically shows the construction of an image signal reproducing apparatus according to the embodiment of the present invention.

Figure 3:
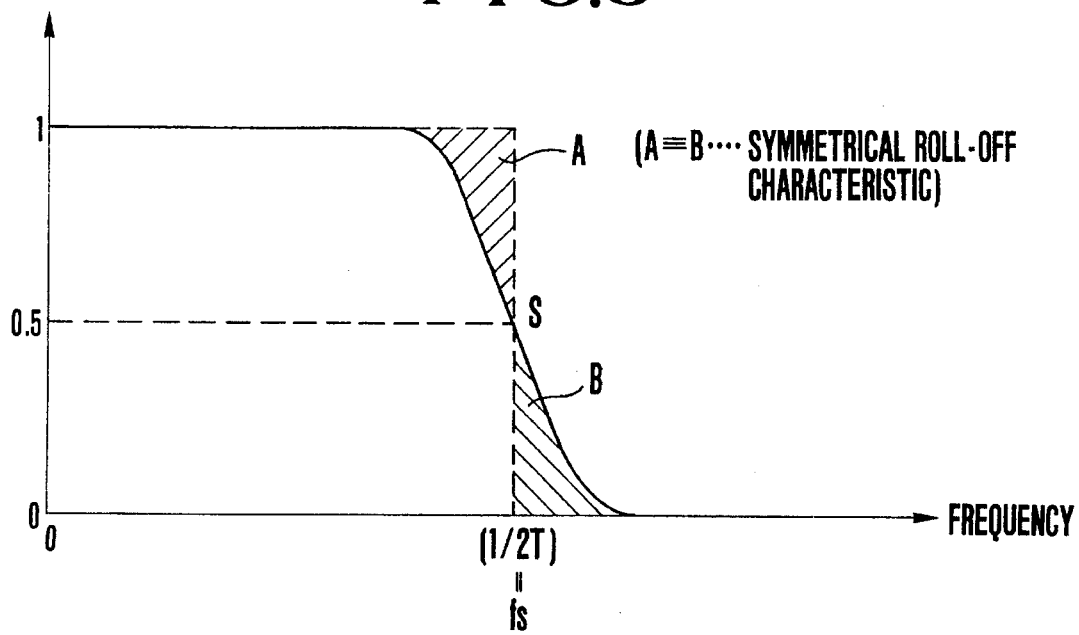
FIG. 3 is a graph showing transmission path characteristics in the analog transfer of sampled values.
Figure 5:
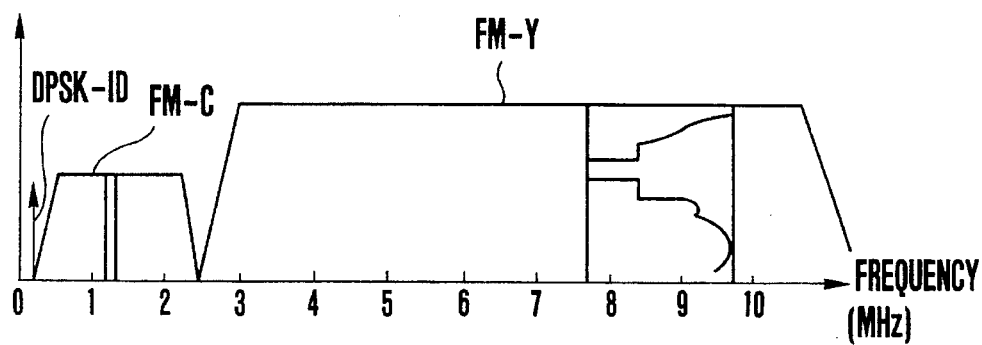
FIG. 5 is a view showing the frequency allocation of a recorded signal based on an SV format.
Figure 4:
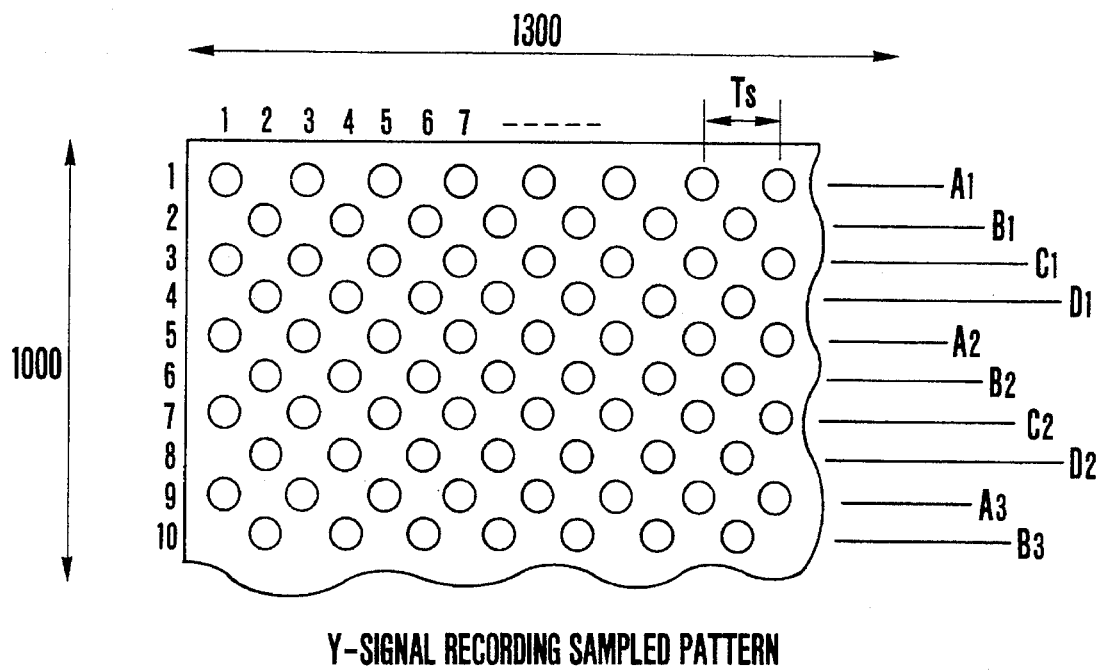
FIG. 4 is a view showing sample points for a Y signal to be recorded on a recording medium.
Figures 6A, 6B:
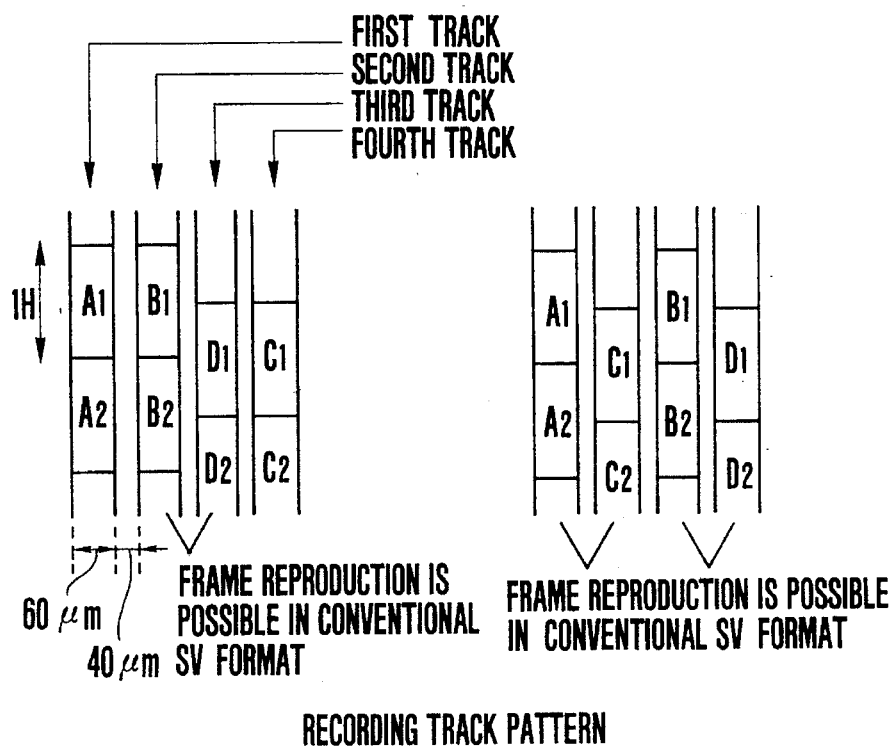
FIGS. 6(a) and 6(b) are views showing recording-track patterns on a recording medium.
Figure 9:
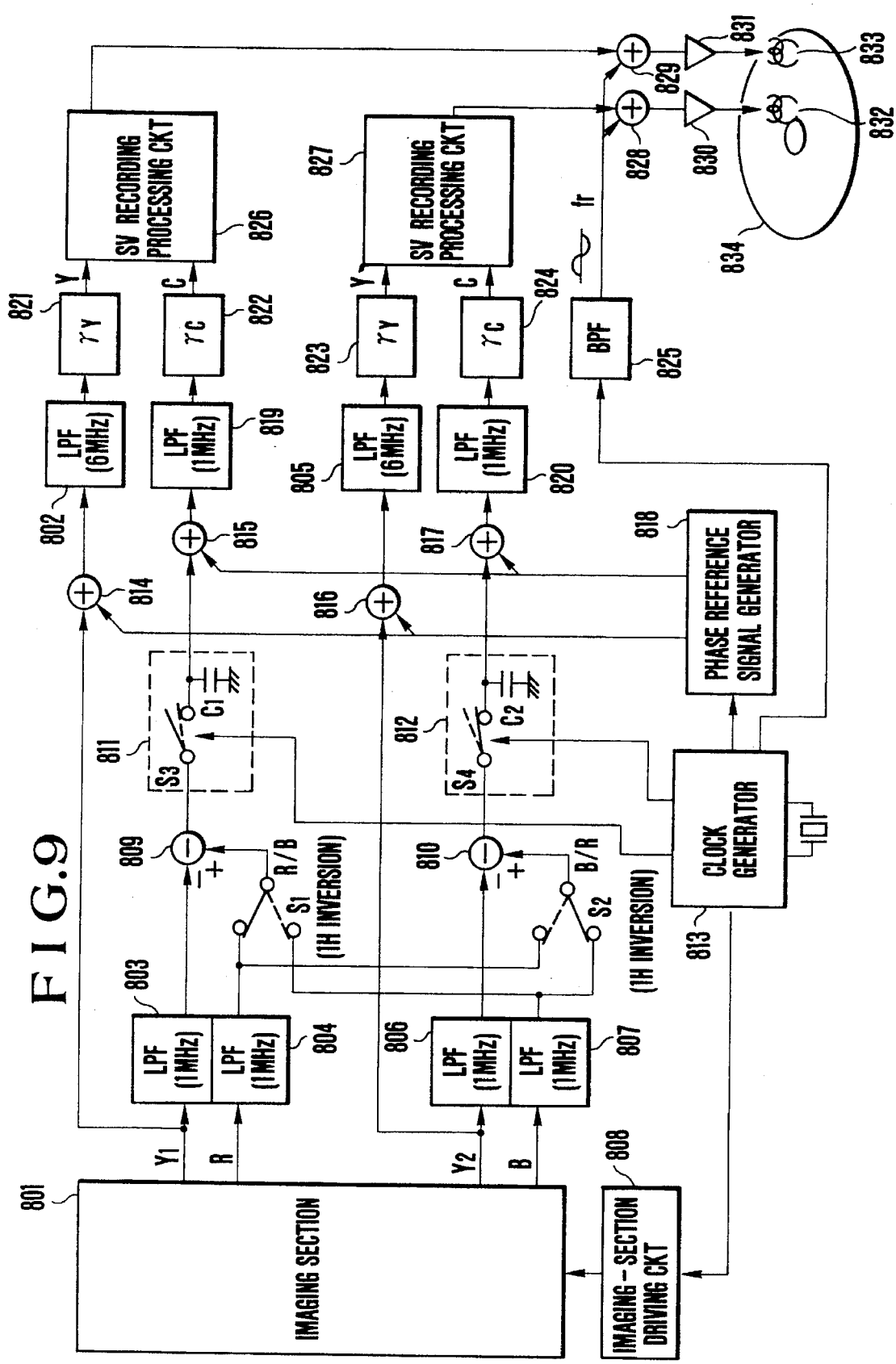
FIG. 9 is a block diagram showing the primary construction of the recording system of a CHSV camera.
Figure 10:
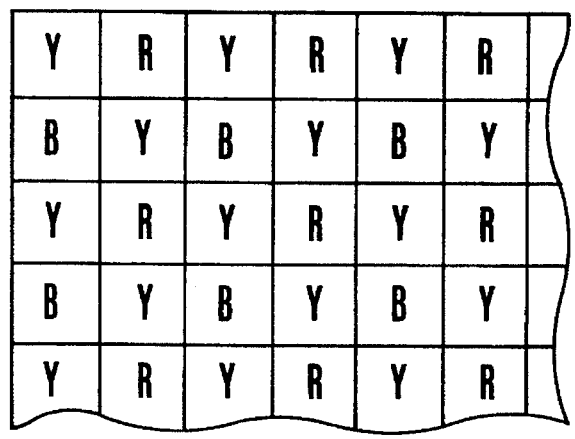
FIG. 10 is a schematic view showing an example of the arrangement of color filters when an imaging section is formed by a signal solid-state image sensor.
Figure 11:
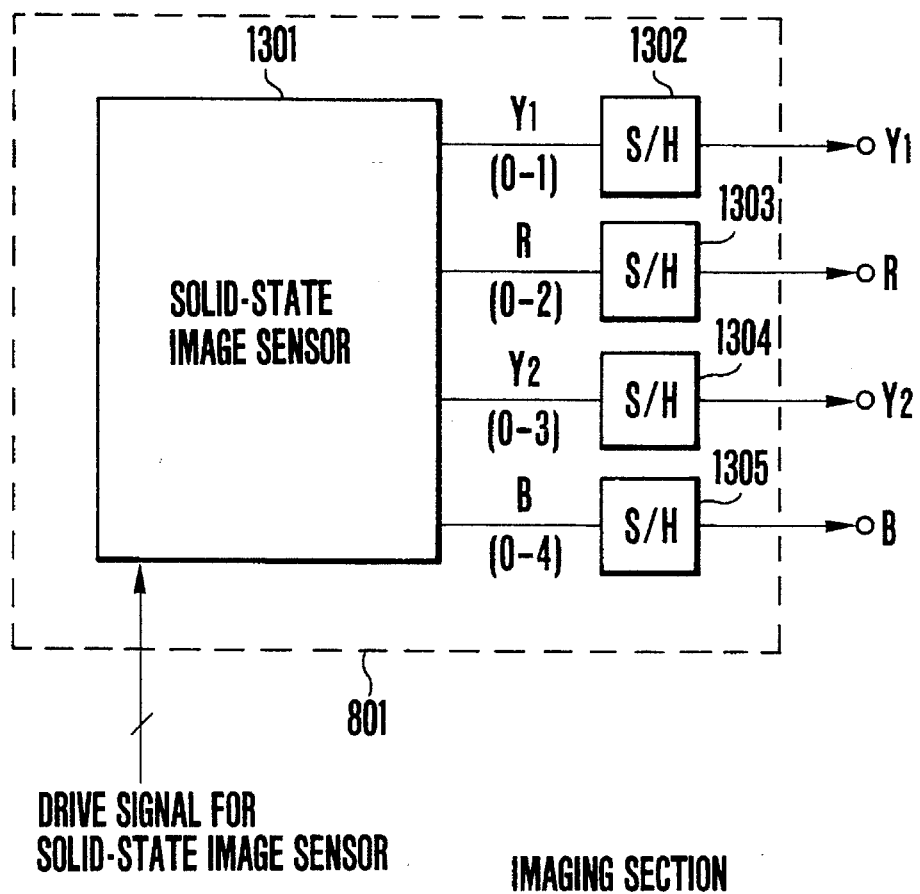
FIG. 11 is a block diagram showing the construction of an imaging section which includes the color filter assembly having the arrangement shown in FIG. 10.
Figure 12:
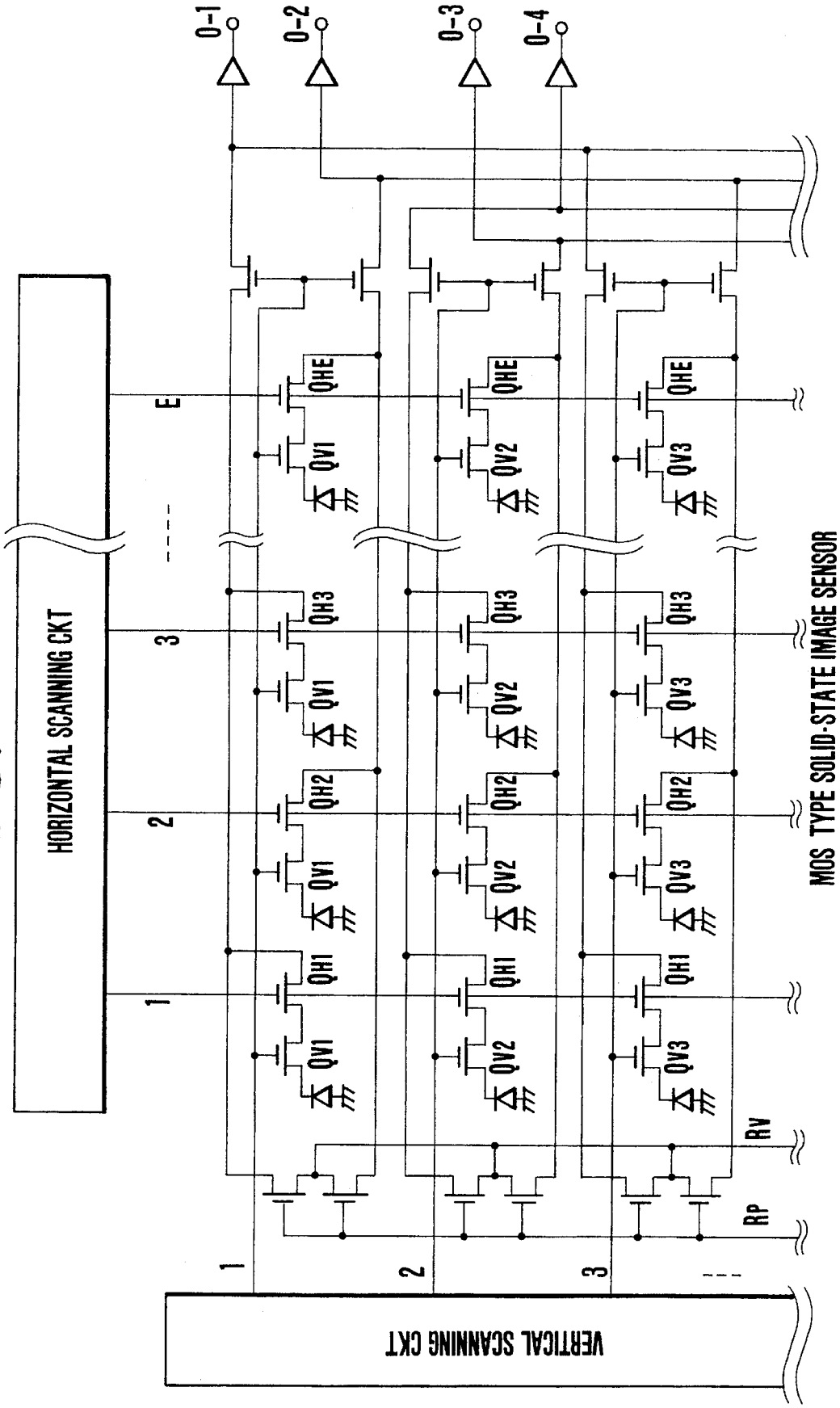
FIG. 12 is a circuit diagram showing a MOS type solid-state image sensor capable of simultaneously reading signals for two adjacent lines every other two lines.
Figure 14:
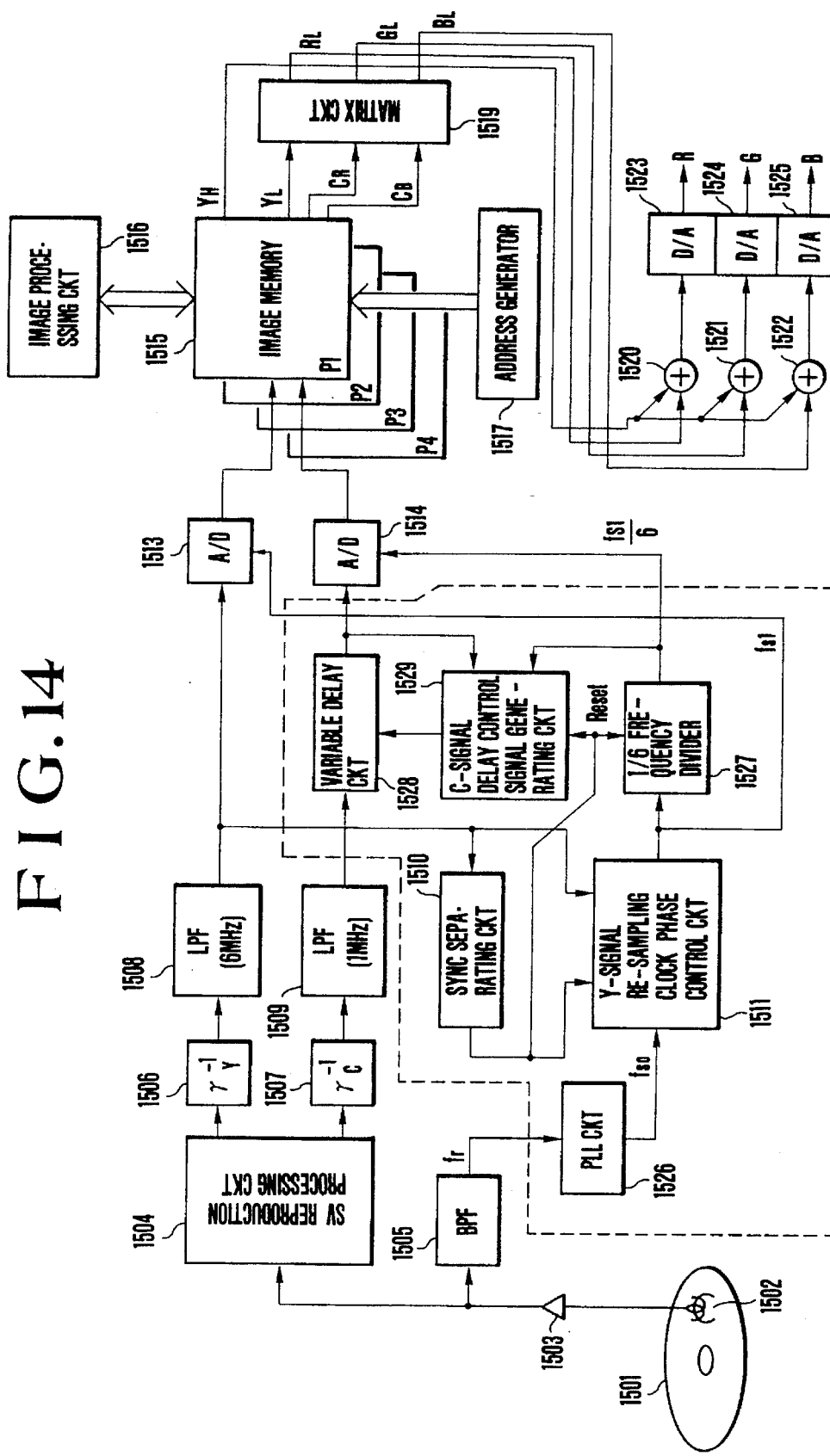
FIG. 14 is a block diagram showing the construction of a CHSV reproducing apparatus.
Figure 15:
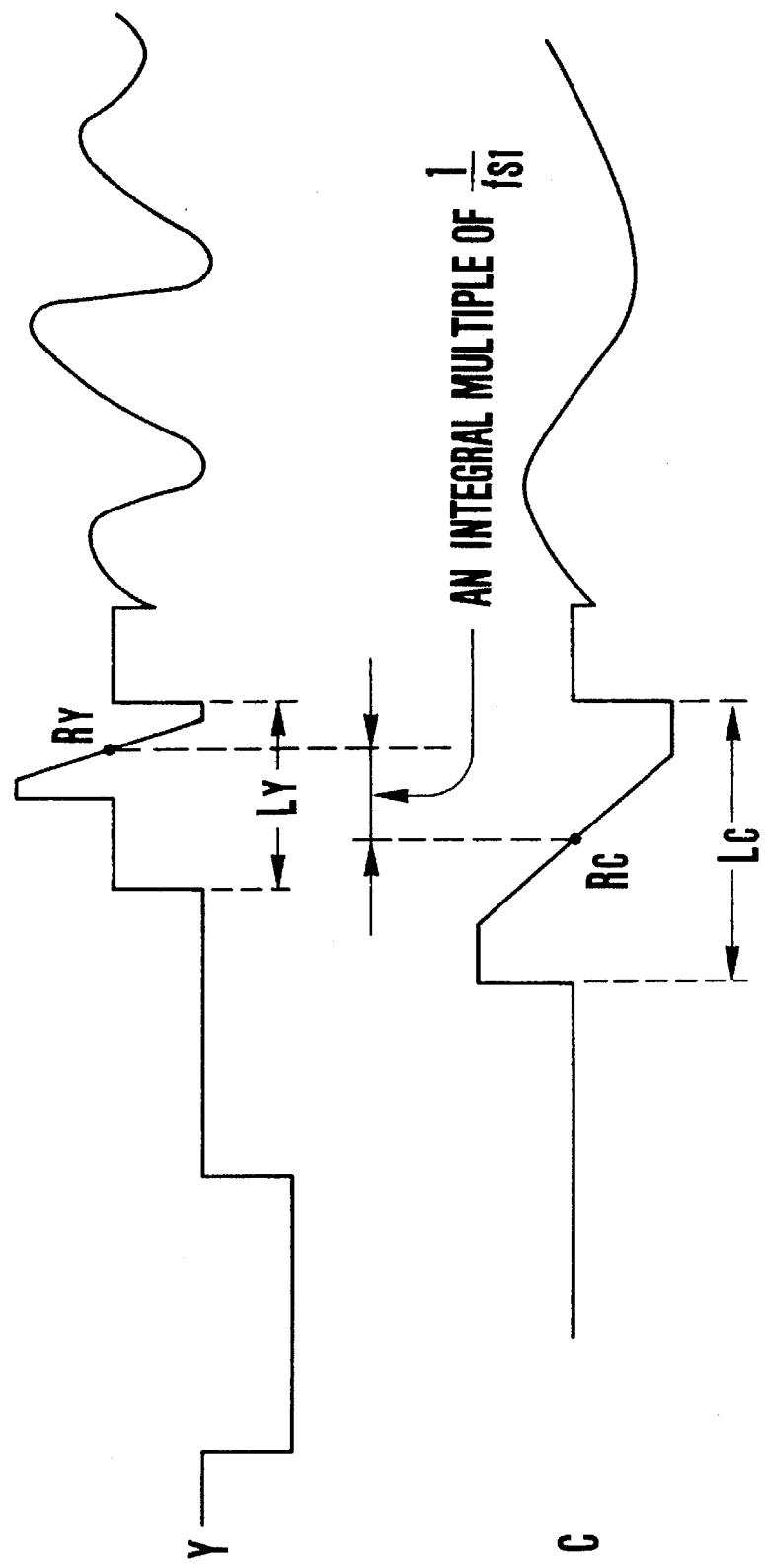
FIG. 15 is a diagram showing the relationship between a phase reference signal for a Y signal and that for a C signal.

Referring to FIG. 16, a head selecting mechanism 11 includes a detector circuit 1, a sample-and-hold circuit (S/H) 2, a microprocessor 3, a switch (SW) 4, magnetic heads 5 and 6, and a head moving mechanism 7. In FIG. 16, the same reference numerals are used to denote the same parts as those used in the image signal reproducing apparatus shown in FIG. 14, and a detailed description thereof is omitted. For the sake of simplicity, an explanation is given of only the head selecting mechanism 11.

Figure 17:
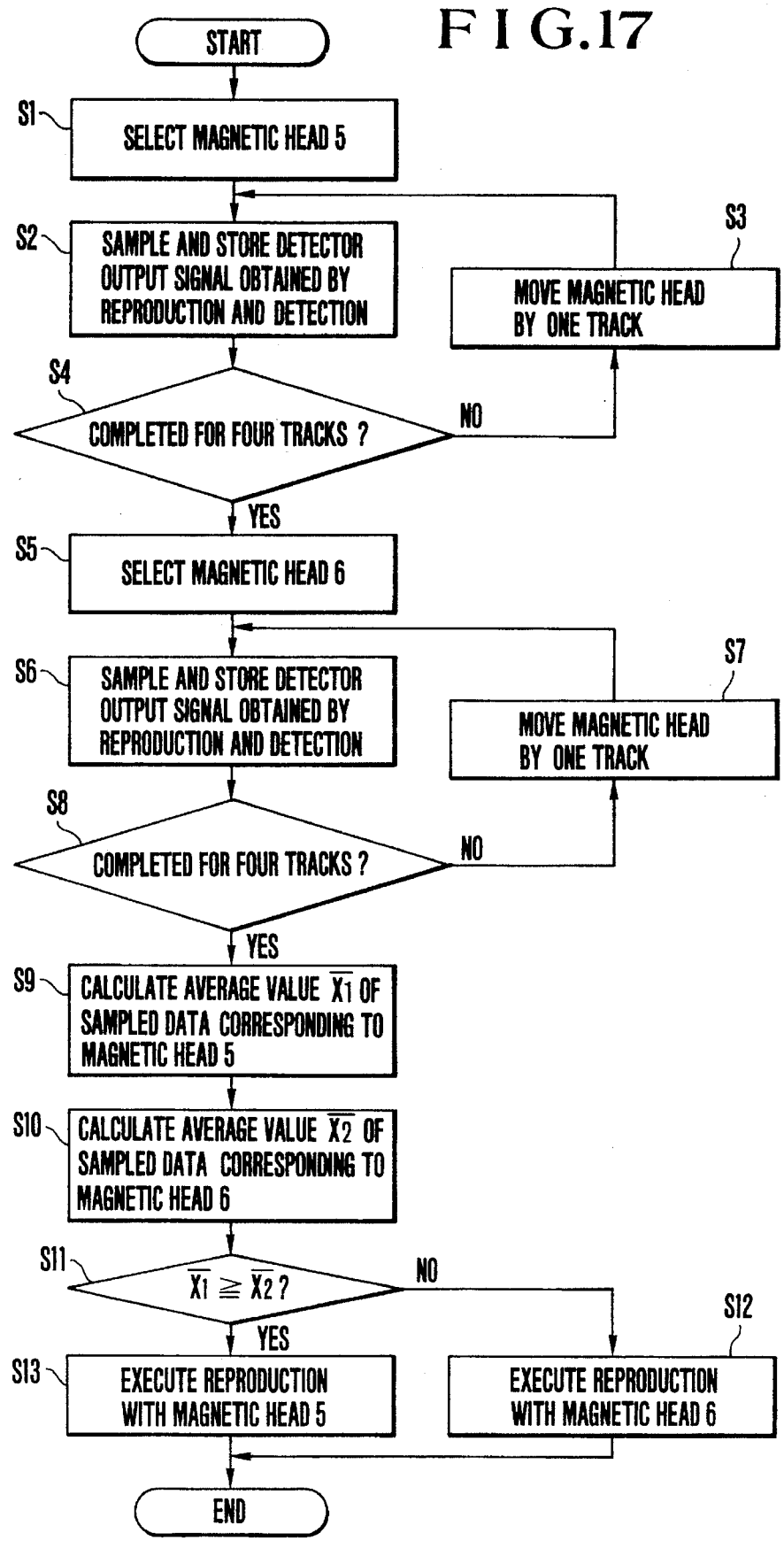
FIG. 17 is a flow chart which serves to illustrate the operation of the apparatus shown in FIG. 16.

FIG. 17 is an operational flow chart showing the operation of the apparatus of FIG. 16. The operation of the apparatus shown in FIG. 16 is explained below in accordance with the steps illustrated in the operational flow chart of FIG. 17.

A magnetic disc 1501 is actuated by a motor (not shown) and reaches a predetermined rotational speed. When either the magnetic head 5 or the magnetic head 6 is selected by the switch (SW) 4, the signal reproduced by the selected head is supplied to a reproducing amplifier 1503. When the magnetic head 5 is selected by the SW 4 (Step S1 of FIG. 17), an image signal is reproduced by the magnetic head 5. The signal amplified by the reproducing amplifier 1503 is supplied to the detector circuit 1, and the signal envelope-detected by the detector circuit 1 is supplied to the S/H 2 as a detector output signal. The S/H 2 samples the level of the detector output signal at the rate of twenty to thirty samples per rotation of the magnetic disc 1501. The set of data obtained by such sampling in the S/H 2 is supplied to the microprocessor 3, and the microprocessor 3 stores the supplied set of data (Step S2 of FIG. 17).

When the above operation is completed, the magnetic head 5 is caused to move by one track in the radial direction of the magnetic disc 1501 in accordance with a command of the microprocessor 3 (Step S3 of FIG. 17). Then, the corresponding track is reproduced during one rotation of the magnetic disc 1501, and the obtained detector output signal is sampled at the rate of twenty to thirty samples per rotation. The set of data obtained by such sampling is stored in the microprocessor 3. After the above-described operation sequence has been performed for a total of four tracks on the magnetic disc 1501 (Step S4 of FIG. 17), the SW 4 is switched to select the magnetic head 6 (Step S5 of FIG. 17). The magnetic head 6 executes a sequence of operations similar to the above-described one on four tracks on the magnetic disc 1501. In the above-described manner, the signals reproduced by the magnetic head 6 are envelope-detected, and the obtained detector output signals are stored in the microprocessor 3 as sampled data (Steps S6, S7 and S8 of FIG. 17).

Then, the microprocessor 3 averages the stored sampled data to obtain the average values of the envelope levels of the signals reproduced by the respective magnetic heads 5 and 6 (Step S9 and S10 of FIG. 17), thereby selecting a magnetic head which corresponds to an envelope level having a larger average value (Step S11 of FIG. 17). In Step S11, if the average values of the two envelope levels are equal, the magnetic head 5 is selected. After such selection has been completed, the selected magnetic head is used to reproduce image signals with high definition in a manner similar to that explained in connection with the reproducing apparatus shown in FIG. 14. In this manner, it is possible to prevent image quality from deteriorating due to nonuniformity in the characteristics of the magnetic heads 5 and 6 (Steps S12 and S13 of FIG. 17).

In the above embodiment, the magnetic heads are selected by utilizing the average values of the envelope levels of the signals reproduced by the respective magnetic heads. Alternatively, such selection may be achieved by comparing the minimum values of the envelope levels of the signals reproduced by the individual magnetic heads. In this case, it is also possible to prevent one part of picture from deteriorating compared to the other part.

Otherwise, arithmetic operations may be performed by using an evaluation function for appropriately weighting and summing the average values and the minimum values of the envelope values of the signals reproduced by the respective magnetic heads, and the desired magnetic head may be selected on the basis of the result of the arithmetic operations.

The nonuniformity in the sampled data obtained from the respective four tracks may be compared to select a magnetic head which corresponds to the smallest degree of nonuniformity.

The envelope levels of the signals reproduced by the respective magnetic heads may not be utilized. Instead, a predetermined reference signal may be recorded on each track during recording and reproduced during reproduction. In this case, the desired magnetic head is selected on the basis of the result obtained by measuring parameters such as an S/N ratio, frequency characteristics and the like.

The above embodiment is arranged to reproduce an image signal recorded on a recording medium by means of a magnetic head which has optimum characteristics among a plurality of magnetic heads. However, it is also possible to adopt an arrangement in which a plurality of magnetic heads having substantially the same characteristics may be used for reproduction at the same time.

As is apparent from the foregoing, the apparatus illustrated as the embodiment of the present invention is arranged to reproduce an image signal recorded on a recording medium by means of a magnetic head which has optimum characteristics among a plurality of magnetic heads. Accordingly, it is possible to prevent image quality from deteriorating due to nonuniformity in the characteristics of the magnetic heads, thereby enabling an image signal to be reproduced with high quality.

What is claimed is:

1. Information signal reproducing apparatus for recording an information signal by using n (an integer not less than two) heads simultaneously and reproducing the information signal from a recording medium on which the information signal is recorded, in accordance with a recording format forming n tracks on the recording medium comprising:
   (A) n heads for tracing n tracks on the recording medium and reproducing an information signal recorded on the tracks;
   (B) detection means for, when reproducing the n tracks formed on the basis of the recording format on the recording medium, detecting in sequence each reproduction condition of the n heads for the recording medium prior to the operation of a reproduction; and
   (C) reproduction processing means for selecting m (a positive integer less than n) heads out of the n heads in accordance with the results detected by the detection means and performing a reproduction operation to reproduce in sequence the information signal recorded on the n tracks on the recording medium by using the m selected heads.

2. An apparatus according to claim 1, wherein the detection means is arranged so as to detect in sequence each reproduction condition of the n heads corresponding to each of the n tracks.

3. An apparatus according to claim 1, wherein the reproduction processing means is arranged so as to select one head out of the n heads and perform a reproduction operation to reproduce an information signal recorded on the n tracks on the recording medium by using the selected head.

4. An apparatus according to claim 1, wherein the recording medium includes a circular type of recording medium.

5. Information signal reproducing apparatus for recording an information signal by using four heads simultaneously and reproducing the information signal from a recording medium on which the information signal is recorded, in accordance with a recording format forming four tracks on the recording track, comprising:
   (A) four heads for tracing four tracks on the recording medium and reproducing an information signal recorded on the four tracks;
   (B) detection means for, when reproducing the four tracks formed on the basis of the recording format on the recording medium, detecting in sequence each reproduction condition of the four heads for the recording medium prior to the operation of a reproduction;
   (C) reproduction processing means for selecting a head out of the four heads in accordance with the results detected by the detection means, performing a reproduction operation to reproduce in sequence the information signal recorded on the four tracks on the recording medium by using the selected head and outputting the information signal; and
   (D) memory means for storing in sequence an information signal outputted from the reproduction processing means.

6. An apparatus according to claim 5, wherein the detection means is arranged so as to detect in sequence each reproduction condition of the four heads corresponding to each of the four tracks.

7. An apparatus according to claim 6, wherein the detection means includes:
   (A) detector means for detecting a signal reproduced in sequence from a track on the recording medium by the four heads and outputting the detected signal;
   (B) sampling means for sampling at a predetermined sampling timing the detected signal outputted from the detector means and outputting in sequence the sampling data; and
   (C) selecting means for comparing each other the sampling data outputted in sequence from the sampling means and selecting one head out of the four heads.

8. An apparatus according to claim 5, wherein the recording medium includes a circular type of recording medium.

* * * * *

UNITED STATES PATENT AND TRADEMARK OFFICE
CERTIFICATE OF CORRECTION

PATENT NO. : 5,508,856

DATED : April 16, 1996

INVENTOR(S): Ryo Fujimoto

It is certified that error appears in the above-identified patent and that said Letters Patent is hereby corrected as shown below:

Col. 4, line 7, after 7(c), insert -- . --.

Col. 12, line 17, change "track" to -- medium --.

Signed and Sealed this

First Day of April, 1997

BRUCE LEHMAN

Attest:

Attesting Officer

Commissioner of Patents and Trademarks